Jan. 4, 1966

P. BETTS 3,226,982

GYROSCOPE WITH LIQUID IMMERSED ROTOR

Filed June 16, 1961

INVENTOR.
PETER BETTS

BY Hansen and Lane

ATTORNEYS

INVENTOR.
PETER BETTS

BY Hansen and Lane

ATTORNEYS

United States Patent Office 3,226,982
Patented Jan. 4, 1966

3,226,982
GYROSCOPE WITH LIQUID IMMERSED ROTOR
Peter Betts, 774 Macredes Ave., San Jose, Calif.
Filed June 16, 1961, Ser. No. 117,752
4 Claims. (Cl. 74—5.6)

The present invention relates to a gyroscope, and pertains more particularly to a gyroscope with a liquid enclosed and driven gyro rotor, light beam reflecting means being provided for indicating axial tilting of the rotor and magnetic means for restoring the rotor to a desired axial position when displaced therefrom.

In the past, gyroscopes have been developed with a high degree of sensitivity which allows them to process with minimum restriction, and also with delicate means for sensing axial displacement thereof with respect to a reference plane or axis. These attributes are important for a gyroscope which is used in conjunction with any one of a number of mechanisms for indicating position, and displacement from position, of a mechanism in which the gyroscope is mounted, for example an aircraft or missile. However, such delicately balanced prior gyroscopes frequently have not been able to withstand the substantial inertial and accelerative stresses to which such mechanism may sometimes be subjected.

The present invention provides a gyroscope having the rotor thereof free within a rotating body of liquid of greater specific gravity than the rotor itself, and employing as an indicating element a light beam reflected from a reflective surface provided for such purpose on the gyro rotor.

Another object of the invention is to provide a gyroscope wherein the rotor consists of a substantially spherical member immersed in a quantity of liquid contained in a spherical chamber centered on the axis of rotation of a rotary housing, electro-magnetic means being provided for restoring the rotor to axially aligned condition within its chamber after having been displaced therefrom.

A further object of the invention is to provide an improved, simple, rugged and sensitive gyroscope.

A still further object is to provide a gyroscope with magnetic means for varying the sensitivity of the gyroscope.

These, and other objects and advantages of the invention, will be apparent from the following description and the accompanying drawings, wherein:

FIG. 1 is a somewhat diagrammatic, longitudinal, vertical, sectional view of a gyroscope embodying the invention, the rotor being shown in solid lines in axially aligned relation with its housing, and in broken lines in axially displaced relation relative thereto, a light beam tilt-indicating mechanism and operative circuit therefor also being shown diagrammatically, a reflected light beam being shown in broken lines in the position it occupies with the rotor in axially aligned condition, and in dash-dot lines, with the rotor in an axially tilted condition.

Figure 1:
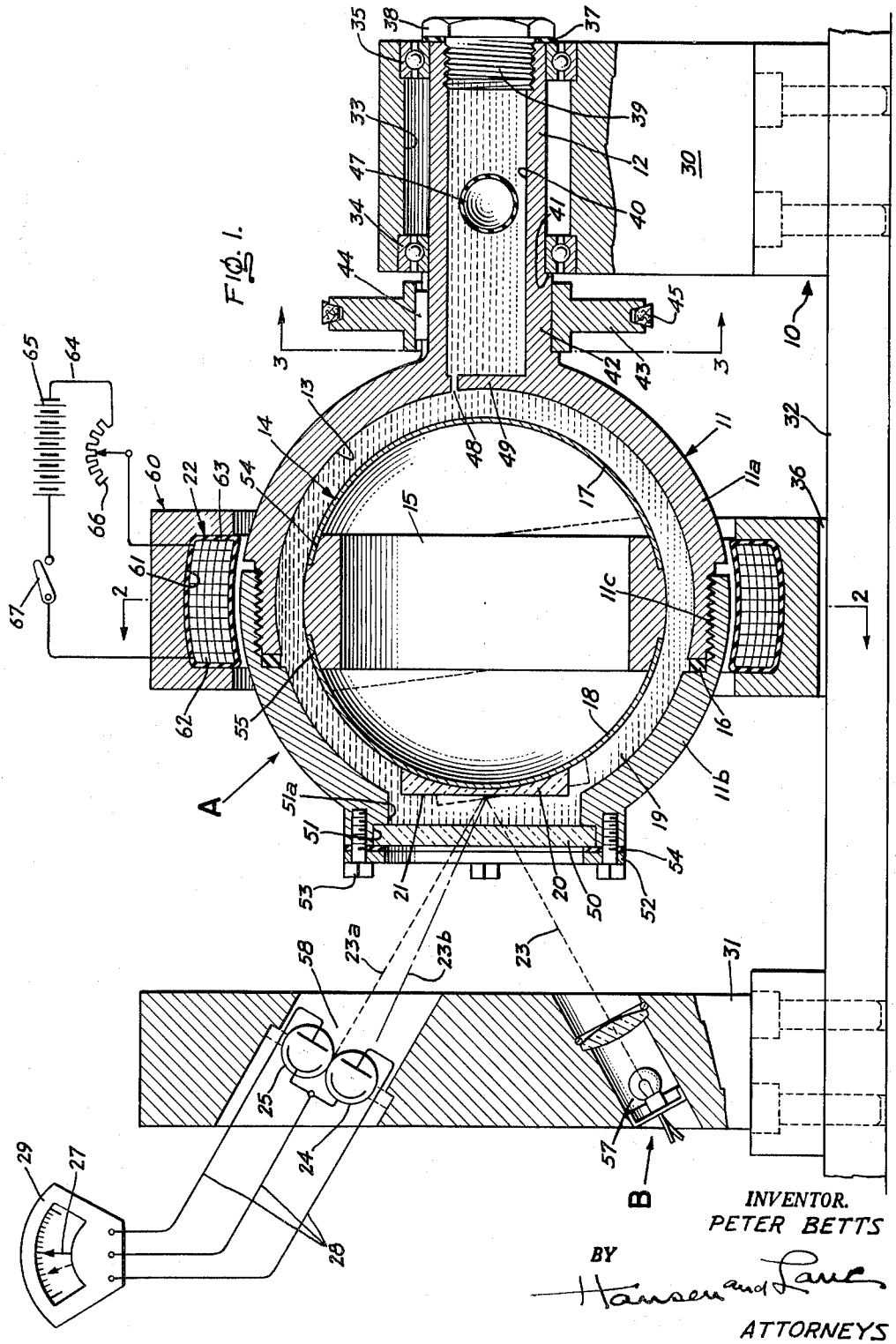

Briefly, the drawings show an illustrative form A of the invention which comprises a strong, rigid, support frame 10 of non-magnetic material, such as aluminum, with a rotary housing 11 journaled thereon. The housing 11 comprises a hollow spindle portion 12 openly communicating with the interior of a hollow spherical housing portion 13. Inside the sperical housing portion 13 is a substantially spherical gyro-rotor 14, comprising annulus 15 of relatively heavy, magnetically permeably material, such as, for example, soft iron, and substantially hemi-spherical fairings 17 and 18. The gyro-rotor 14 is of smaller diameter than the interior of the housing portion 13, and the space therebetween, as well as the interior of the hollow spindle 12 which communicates with such space, is filled with a suitable liquid 19 of greater specific gravity than the assembled rotor 14.

A mirror disc 20 is affixed to the rotor fairing member 18 co-axially of the annulus 15, with a plane surface 21 of the mirror perpendicular to the axis of said annulus, which axis is considered herein as the axis of the rotor 14. An annular electro-magnet 22 surrounds the housing 11 in spaced relation thereto, and when energized urges the gyro-rotor 14 toward a position co-axially of the housing 11, and also tends to maintain the gyro-rotor in such co-axial position. Thus by energizing the electro-magnet 22, the resistance of the gyroscope to angular change may be increased.

Light generating means B are provided to project a light ray 23 toward the mirror 20 whence it is reflected when the gyro-rotor is co-axial with its housing 11, along the line 23a centrally between, or at least equally illuminating, a pair of photo cells 24 and 25. Such equal illumination of the cells 24 and 25 produces zero deflection of the needle 27 of an indicating instrument 29. When the reflected light beam is deflected from its centered condition 23a between the photo cells 24 and 25, for example, is tilted up or down by a corresponding axial tilting of the gyro-rotor 14 relative to the rotary housing 11 as indicated by the dash-dot line 23b in FIG. 1, one or the other of the photo cells 24 or 25 will receive an increased amount of light, thereby unbalancing the circuit 28 of the instrument 29 and producing a corresponding deflection of the needle 27 of said instrument.

Referring to the drawings in greater detail, the rigid frame 10 may be of any suitable construction, and, as illustrated, comprises a rotor support standard 30, a light beam mechanism support standard 31 (FIG. 1) and a pair of magnet support standards 36 (FIG. 2), all fixedly secured to a rigid base plate 32.

The rotor standard 30 has a shaft opening 33 therethrough, said opening being counterbored at both ends for the mounting of a pair of ball bearings 34 and 35 therein. The rotor spindle portion 12 is journaled in these ball bearings, and the inner race of the bearing 35 is retained against axially outward displacement by a sealing washer 37 of suitable material, such as, for example, bronze, gripped tightly between the outer end of the rotor spindle portion 12 and the head 38 of a threaded plug 39. The latter is screwed into the threaded outer end of the bore 40 of the hollow spindle portion 12 to seal the latter against leakage of the liquid 19.

The inner race of the outer ball bearing 34 bears against a shoulder 41 provided by a slightly enlarged spindle portion 42 upon which a grooved drive pulley 43 is fitted. The latter is retained against relative rotation with respect to the spindle portion 12 by a conventional, flat key 44, seated in registering keyways provided therefor in the pulley 43 and the spindle portion 42, respectively. A conventional V-belt 45 passes around the grooved pulley 43 and is driven at a required operative speed by suitable drive means, such as a conventional electric motor (not shown).

Resiliently compressible means, such as, for example, a small, air-filled, sealed rubber ball 47, is inserted in the spindle bore 40 before sealing the latter by means of the plug 39 to permit thermal expansion and contraction of the liquid 19, housing 11 and gyro-rotor 14 without unduly stressing either the housing 11 or the gyro rotor 14 therein. Communication between the bore 40 of the housing spindle portion 12 and the spherical rotor chamber 13 is provided by an aperture 48 in a partition 49 separating the chamber 13 from the bore 40.

The housing 11 comprises two overlapping portions 11a and 11b, which are screwed together by means of threads 11c as shown in FIG. 1 to provide the spherical rotor chamber 13, and are sealed by a usual gasket 16. The housing portion 11a is integral with the hollow spindle 12, and a window disc 50 of highly transparent material such as, for example optical glass, is fitted into a circular seat 51 provided therefor around an opening 51a provided in the spherical housing portion 11b, which opening 51a is co-axial with the hollow spindle 12 when the housing 11 is assembled as in FIG. 1. A flange 52 overlaps the margin of the window 50, and is attached to the housing 11 by screws 53 to retain the window 50 in its seat. A sealing gasket 54 seals the window 50 to the housing 11.

The rotor annulus 15 is a ring of suitable magnetically permeable material, such as, for example, soft iron, and is of smaller external diameter than the diameter of the spherical rotor chamber 13. The two substantially hemispherical rotor fairing portions 17 and 18 fit into peripheral recessed seats 54 and 55, respectively provided therefor around opposite sides of the rotor annulus 15. The fairing portions 17 and 18, in conjunction with the periphery of the annulus 15 between the seats 54 and 55 so complement each other that the complete rotor assembly 14, except for the mirror 20, is of spherical shape.

The mirror 20 is a plane-concave disc, and is fitted onto, and secured to the rotor fairing member 18 co-axially of the rotor annulus 15. The outer plane surface 21 of the mirror 20 is perpendicular to the axis of rotation of the gyro-rotor 14 of which it forms a part, and preferably is silvered so as to reflect a large portion of the incident light of the pencil beam 23 from a conventional light beam projector 57. If desired a second mirror (not shown) may be similarly provided on the rotor fairing member 17 to insure operation in the event the rotor should be axially reversed in its chamber 13.

The light beam projector 57 may be of conventional design, and is shown only diagrammatically in FIG. 1. It projects the narrow, pencil beam 23 of light toward the axial center of the reflecting surface 21 when the rotor 14 is co-axial with the spindle 12. The light beam 23 is reflected from the mirror surface 21 at an angle equal to its angle of incidence therewith toward the multiple-photo-cell structure 58, also mounted in the standard 31. As illustrated, the photo cell structure 58 comprises a plurality of photo cells such as the photo cells 24 and 25, so arranged around a central point that when the gyro-rotor 14 is co-axial with the spindle 12 the reflected light beam 23a passes centrally between the photo cells. These photo cells are connected to the indicating instrument 29 by a conventional balanced circuit indicated diagrammatically at 28 and the indicating instrument 29 may be, for example, a milliammeter. When the reflected light ray 23a is directed centrally of the photo cells 24 and 25, the indicator 29 will show a zero reading, while when the reflected light beam is displaced as at 23b toward one or the the other of the photo cells 24 or 25, to thereby illuminate it more than the other, the indicator 29 will also so indicate. While only two photo cells are illustrated in the diagrammatic showing of FIG. 1, it is obvious that any desired number of photo cells may be provided and grouped as required, and may be connected by conventional circuitry to one or more indicators 29, to indicate any axially tilted conditions of the rotor 14 required.

Figure 2:
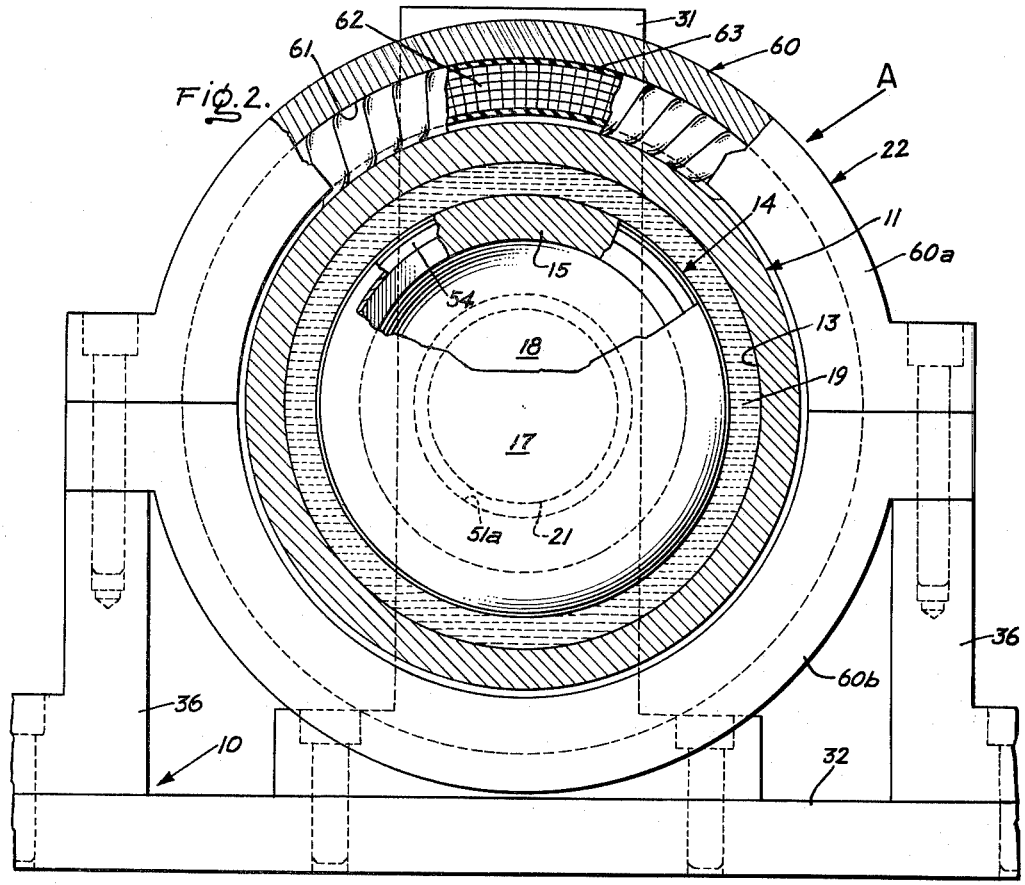
FIG. 2 is a sectional view taken along line 2—2 of FIG. 1.
Figure 3:
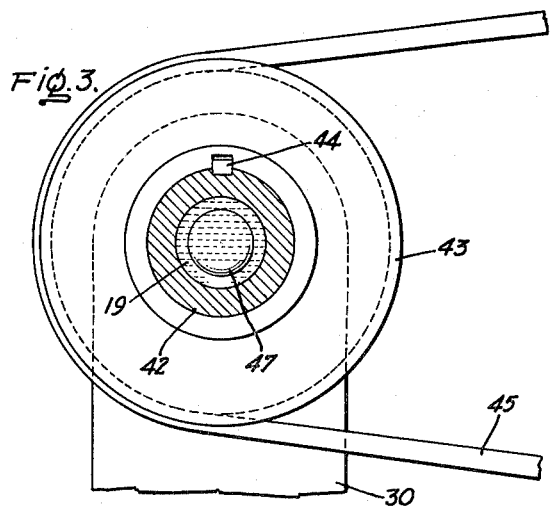
FIG. 3 is a fragmentary sectional view taken along line 3—3 of FIG. 1.

The gyro-rotor aligning electro-magnet 22 comprises a two part, annular core 60 of magnetically permeable material, such as, for example, laminated soft iron, and is mounted co-axially of the housing spindle 12. The core 60 consists of two similar half portions 60a and 60b, and is supported on the base plate 32 by the standards 36 (FIG. 2). The magnet core 60 has an annular cavity 61 in its inner face in which is wound a conventional magnet coil 62 encased in conventional insulating material 63.

The magnet coil 62 is connected in series into a conventional electrical circuit 64, indicated diagrammatically in FIG. 1, and comprising an electric battery 65, preferably a rheostat at 66, and a normally open switch 67. Upon closing the switch 67, and adjusting the rheostat 66, a desired current from the battery 65 energizes the magnet coil 62, and creates a magnetic field which urges the rotor annulus 15 toward a position co-axial with the magnet 22 and rotor housing 11.

The space between the spherical chamber 13 and rotor 14, and also the spindle bore 40, are completely filled with a suitable liquid 19, and the compressible member 47 is inserted in the hollow spindle 12 to absorb compressive stresses caused by temperature changes either in the liquid 19, the housing 11, or the gyro-rotor 14. The liquid 19 employed preferably is one having a low coefficient of thermal expansion, such as, for example, a silicone.

The space separating the rotor 14 from the spherical housing portion is at present not believed to be critical, except that it must not be too slight or the skin friction driving effect from the housing 11 to the liquid 19 and from the latter to the rotor 14 will be too severe to permit proper precession of the rotor 14. The sealing plug 39 is screwed securely into sealing condition in the end of the hollow spindle 12, and is sealed by the gasket washer 37.

In using the gyroscope A, the housing 11 is rotatably driven at a suitable speed by power drive means, such as a conventional electric motor, not shown, driving the drive belt 45 and pulley 43. When the rotary housing 11 is at rest, the gyro-rotor 14 will float in the liquid 19, but when the housing 11 is rotatably driven at a speed sufficient to create gyroscopic action on the part of the rotor 14, the liquid 19 is caused by skin friction of the housing 11 to rotate co-axially therewith, and being of greater specific gravity than the rotor 14, forces the latter by centrifugal force to centered condition therein.

The effect of the rotating liquid 19 on the gyro-rotor 14 tends to restore the rotor into co-axial relation with the housing 11 when displaced therefrom, and to retain it in such co-axial relation during rotation of the housing at a required speed. This restoring and retaining effect may be increased to provide in effect a stiffer gyroscope by energizing the electromagnet 22 by a desired current from the battery 65 during operation of the gyroscope.

The compressible member 47, also being lighter than the liquid 19 in which it is immersed, will also be centered axially within the expansion chamber 40 of the hollow spindle 12 upon rapid rotation of the housing 11.

The gyro-rotor 14, as mentioned previously herein, is rotatably driven by skin friction between the surface of the spherical chamber 13 and the liquid 19, and between the latter and the gyro rotor 14. When the rotor 14 is rotating co-axially within the rotary housing 11, the mirror disc 20 is co-axial with the housing 11, and the miror plane surface 21 is perpendicular to the common axis of rotation of the housing 11 and the rotor 14. In this coaxial condition of the housing 11 and the rotor 14, the light ray 23 is reflected by the mirror along the line 23a as mentioned previously herein, mid-way between the photo cells 24 and 25, and if it illuminates said photo cells at all, it illuminates them equally, and in either case produces a balanced current which leaves the needle 27 of the indicator 29 in its zero position. When a precessing of the frame 10 or other action causes a relative tilting movement of the axes of the gyro rotor 14 and the rotary housing 11, the light beam 23 will be displaced thereby from its centered, broken line position 23a of FIG. 1, for example, along the line 23b toward the photo cell 24, thereby producing an unbalance of the currents produced by the two photo cells 24 and 25, and a resultant displacement of the indicator needle 27.

Instead of the indicator 29 shown in FIG. 1, conventional amplifying means (not shown) connected in a well known manner to suitable control or corrective mechanism (not shown) may be arranged for operation by any unbalance of the circuit 28, for example, to correct or change the course of an aircraft or missile in which the gyroscope A is mounted. Such amplifiers and control or corrective mechanisms are well known to those familiar with gyro mechanisms for controlling flight or other characteristics of a vehicle in which a gyroscope is mounted, and need not, therefore, be illustrated or described herein.

The invention provides a rugged, simple and positively indicating gyroscope, one in which the gyro mechanism has no fragile or easily damaged mounting components, and in which the indicating means is a weighless light beam. The gyro-rotor is also capable of being acted on by the electro-magnet 22, urging the gyro-rotor toward a condition co-axial with the axis of housing rotation, and thus in effect varying the stiffness of the instrument. The entire mechanism is one which easily withstands accelerative and inertial stresses of substantial magnitude.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims:

1. A gyroscope comprising a sealed chamber rotatable about an axis, power means for rapidly rotating the chamber about such axis, a gyro-rotor mounted in the chamber and comprising an annular portion of substantial weight, a fairing portion secured to and enclosing each side of the annular rotor portion, the annular portion and its fairing portions being smaller in diameter than the chamber so as to be spaced inwardly therefrom when the axis of the annular rotor portion is co-incident with the axis of chamber rotation, a quantity of liquid of greater specific gravity than the gyro-rotor completely filling the space between the gyro-rotor and the chamber, and a resiliently compressible member exposed to the liquid for compression thereby upon an increase of pressure on the liquid for absorbing pressure changes caused by thermal expansion and contraction.

2. A gyroscope comprising a rotary housing mounted for rotation about an axis and having a chamber of circular cross sectional shape therein with the center of the chamber located on the axis of housing rotation, a gyro-rotor of smaller diameter than the chamber and immersed in a quantity of liquid filling the chamber, means for rotatively driving the chamber about its axis of rotation, means for indicating the axial position of the rotor relative to the axis of housing rotation, an annular electro-magnet surrounding the housing and spaced radially therefrom, the electro-magnet being fixedly mounted co-axially with the axis of housing rotation, and means for energizing the electro-magnet.

3. A gyroscope comprising a rigid frame, a hollow spindle journaled for rotation about an axis, a rotary housing integral with the spindle and having a substantially spherical chamber therein communicating with the interior of the hollow spindle and with the center of the chamber located on the axis of spindle rotation, a resiliently compressible member in the hollow spindle, a substantially spherical gyro-rotor of smaller diameter than the chamber and immersed in a quantity of liquid filling the chamber, the liquid being of greater specific gravity than the rotor, means for rotatively driving the chamber about its axis of rotation, and light beam reflecting means for indicating the axial position of the rotor relative to the axis of housing rotation.

4. A gyroscope comprising a rotatable housing rotatably about an axis and having a substantially spherical chamber therein located with its center on the axis of housing rotation, a substantially spherical gyro-rotor of smaller diameter than the chamber mounted in the latter, said gyro-rotor comprising a heavy annulus, of magnetically permeable material, the periphery of which is of spherical curvature the annulus having an axis coincident with a diameter of the gyro-rotor, a pair of light weight fairing members of spherical curvature attached in sealed relation one to each side of the annulus, the spherical curvature of the fairing members being complementary to that of the annulus and of equal radius therewith to complete, with the annulus, the spherical gyro-rotor, the space between the gyro-rotor and the chamber being completely filled with a liquid of greater specific gravity than the gyro-rotor, means for rotatably driving the housing about its axis of rotation, an annular magnet surrounding the housing and co-axial with the axis of housing rotation, and means for indicating the relative position of the axis of the gyro-rotor annulus to that of housing rotation.

References Cited by the Examiner
UNITED STATES PATENTS

| | | | |
|---|---|---|---|
| 2,785,573 | 3/1957 | Bentley | 74—5 |
| 2,857,767 | 10/1958 | Werndl | 74—5.37 |
| 2,871,706 | 2/1959 | Fischer et al. | 74—5.7 |
| 2,879,668 | 3/1959 | Mleczko | 74—5.4 |
| 2,968,954 | 1/1961 | Mueller | 74—5.6 |

BROUGHTON G. DURHAM, *Primary Examiner.*

DON A. WAITE, *Examiner.*

T. W. SHEAR, *Assistant Examiner.*